April 6, 1926.
G. S. NEELEY
1,579,454
MEANS AND METHOD FOR PREVENTING SCALE AND INCRUSTATION IN STEAM BOILERS
Filed March 12, 1925     4 Sheets-Sheet 1
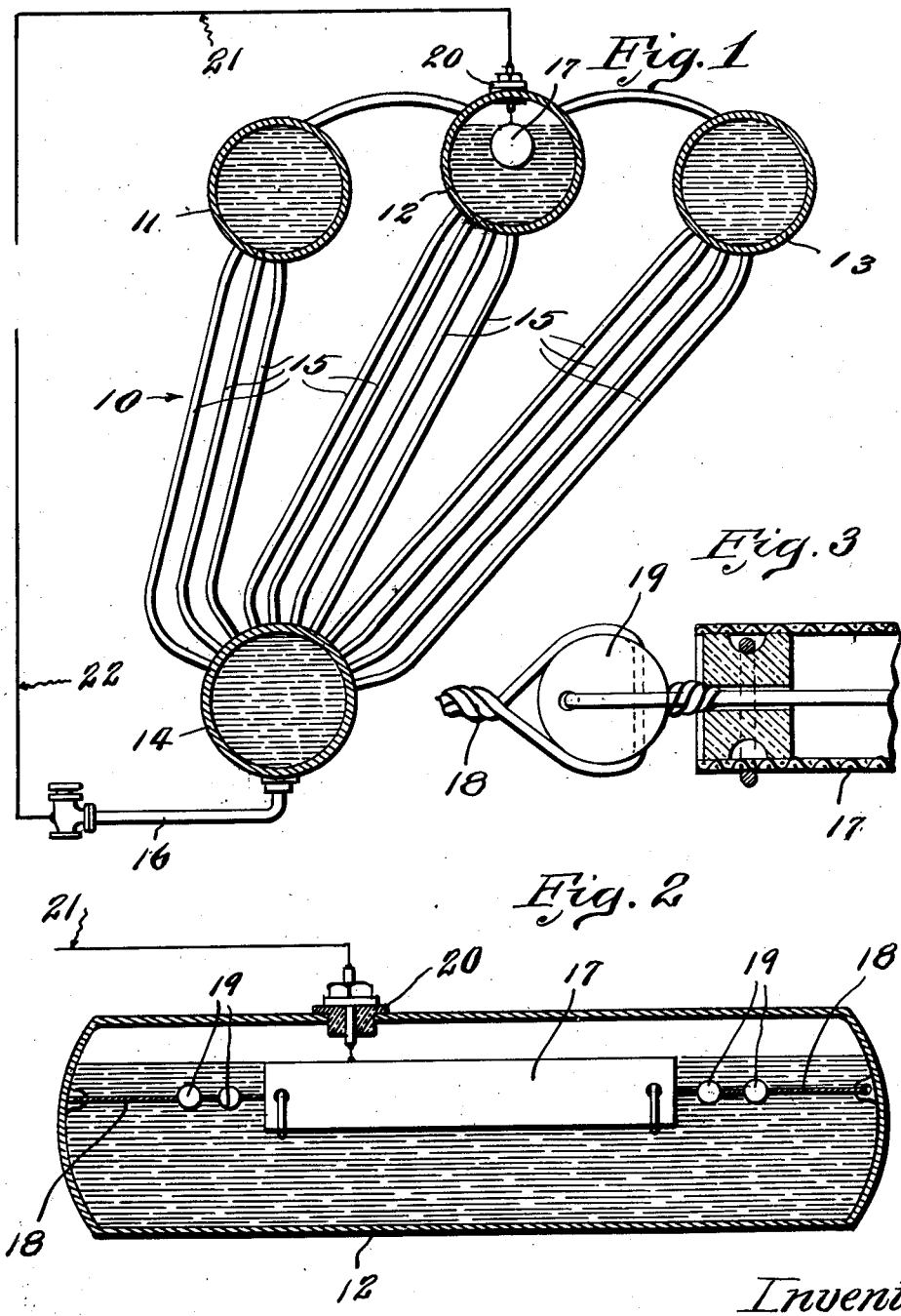
Inventor
George S. Neeley
Cornwall, Bedell & Janus
By     Att'ys

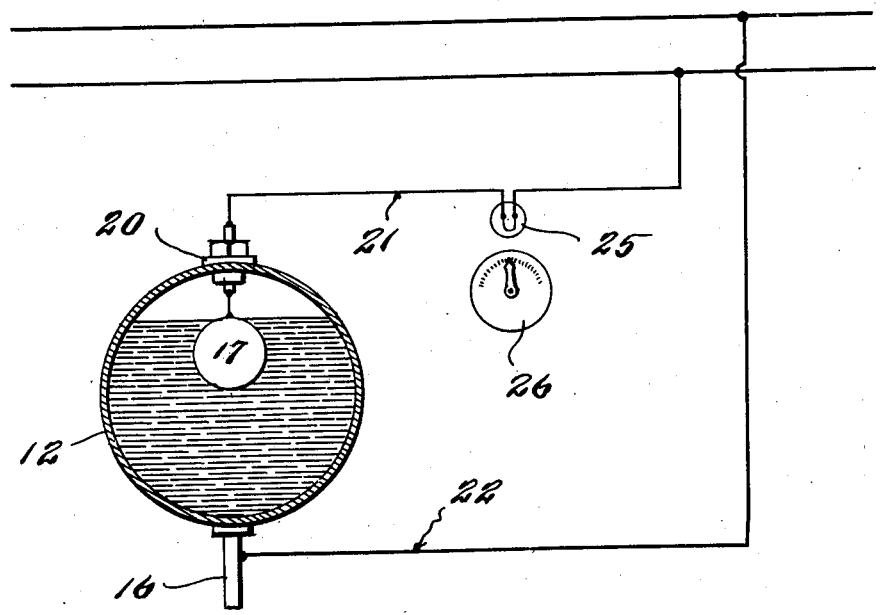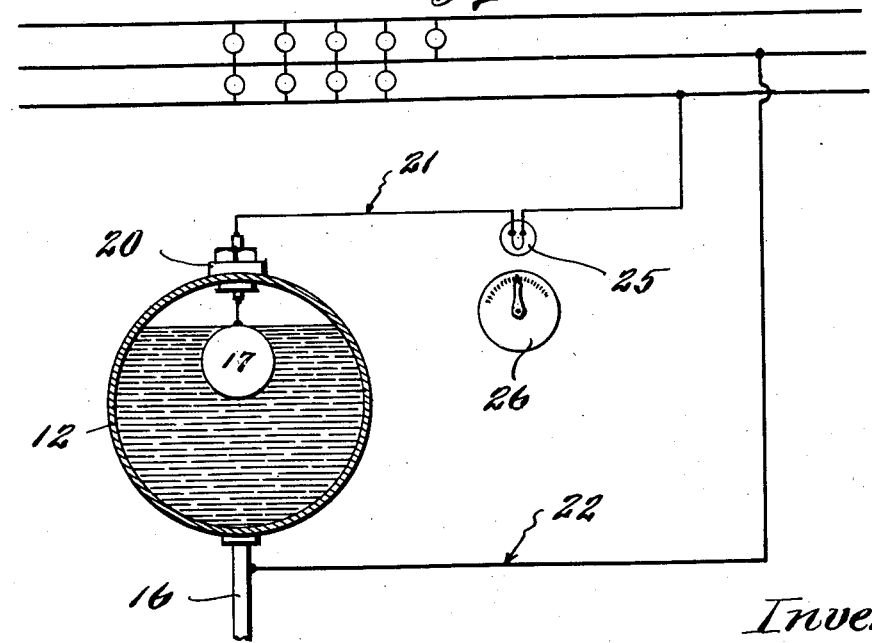

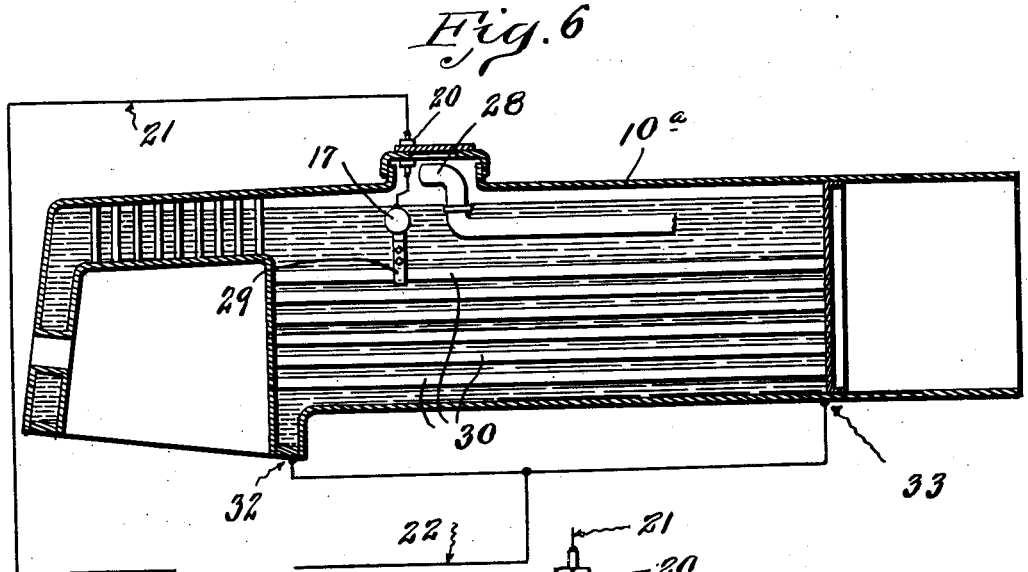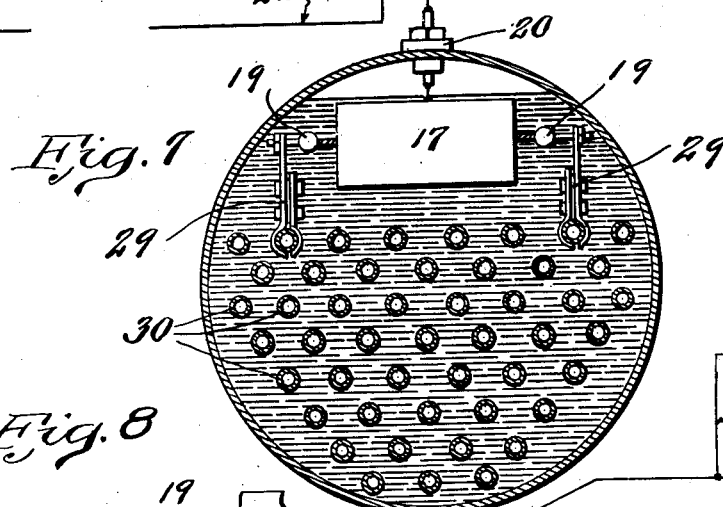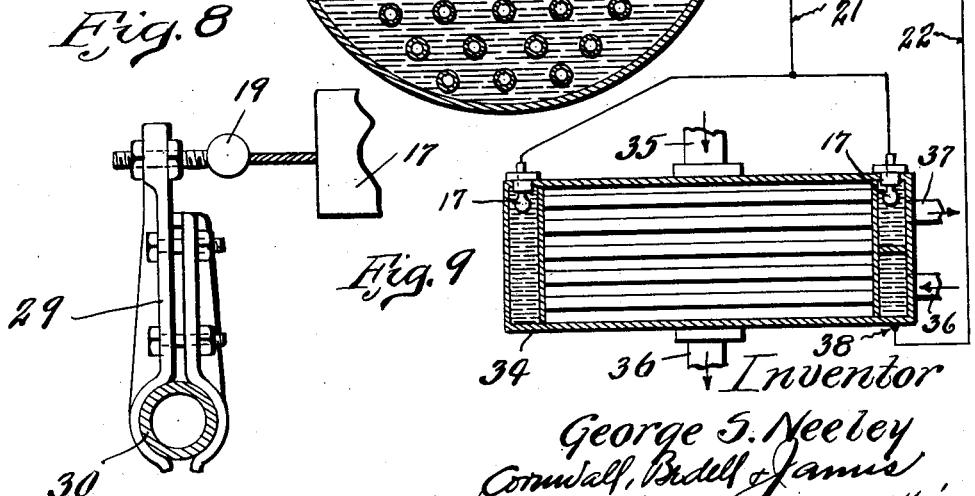

April 6, 1926. 1,579,454
G. S. NEELEY
MEANS AND METHOD FOR PREVENTING SCALE AND INCRUSTATION IN STEAM BOILERS
Filed March 12, 1925 4 Sheets-Sheet 4

Inventor
George S. Neeley
Cromwell, Bidell & Janney
By Attys.

Patented Apr. 6, 1926.

1,579,454

UNITED STATES PATENT OFFICE.

GEORGE S. NEELEY, OF WOOD RIVER, ILLINOIS, ASSIGNOR OF ONE-HALF TO GRIFFIN WATKINS, OF ALTON, ILLINOIS.

MEANS AND METHOD FOR PREVENTING SCALE AND INCRUSTATION IN STEAM BOILERS.

Application filed March 12, 1925. Serial No. 14,913.

*To all whom it may concern:*

Be it known that I, GEORGE S. NEELEY, a citizen of the United States, residing at Wood River, Illinois, have invented a certain new and useful Improvement in Means and Methods for Preventing Scale and Incrustation in Steam Boilers, of which the following is a specification, such as will enable others skilled in the art to which it appertains to make and use the same.

This invention relates to new and useful improvements in means and method for preventing the formation of scale and incrustation in all types of steam boilers, including locomotive boilers, and in all boiler accessories, such as feed water heaters and feed water piping, economizers, condensers, etc., and is an improvement over the invention disclosed in my copending application, filed November 22, 1924, Serial Number 751,543.

The objects of my invention are to provide simple and efficient means for positively removing the scale from all steam boilers and their accessories and for preventing formation of scale in new boilers and boilers from which the scale has been removed.

Further objects of my invention are to connect the boiler or its accessories, or both, at predetermined points in series with an alternating or pulsating current of electricity and subjecting such apparatus and water contained therein to the action of the alternating or pulsating current for the purpose of upsetting or disturbing the action of the electric current generated thermo-electrically in the boiler during the operation thereof.

Still further objects of my invention are to provide suitable means for electrically connecting at predetermined points the boiler and the water contained therein to an external electric circuit whereby such points are short-circuited and the thermo-electric current generated by the boiler is diverted therethrough and prevented from following its usual scale forming path through the water element of the boiler.

Further objects of my invention are to provide means for removing or preventing the formation of scale and incrustation in hot water boilers used for heating, refrigerating apparatus and other apparatus wherein a metal container is used for containing liquid and in which the metal surfaces are liable to have deposited thereon chemical substances by virtue of the action of the electric current generated thermo-electrically in such apparatus.

Other objects of my invention are to provide a method for removing and preventing the formation of scale in boiler apparatus whose cost of operation will be zero to the user, and to provide simple means for practicing my method.

With these and other objects in view, my invention consists in certain novel features of construction and arrangement of parts hereinafter more fully described and claimed, and illustrated in the accompanying drawings, in which—

Figure 1 is a vertical cross section through a standard type of stationary boiler showing in a diagrammatic manner the electric circuit connected thereto.

Figure 2 is a longitudinal cross section through one of the boiler drums and showing one of the conductors of the circuit submerged therein for establishing contact with the water.

Figure 3 is a detail view of one end of the conductor.

Figure 4 is a diagrammatic view showing the boiler connected to an alternating lighting circuit in series with the steam gauge lamp.

Figure 5 is a similar view showing the manner of application to a three wire lighting circuit.

Figure 6 shows the invention applied to a locomotive boiler.

Figure 7 is a detail sectional view of a locomotive boiler showing the electric conductor arranged therein.

Figure 8 is a detail view of the clamping mechanism for supporting an internal-electric conductor.

Figure 9 shows the invention applied to a condenser.

Figure 10:
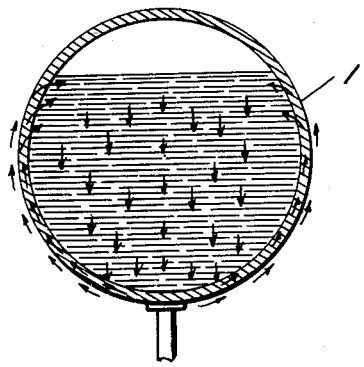
Figure 10 illustrates diagrammatically the travel of the thermo-electric current generated under the natural operative conditions of the boiler.
Figure 11:
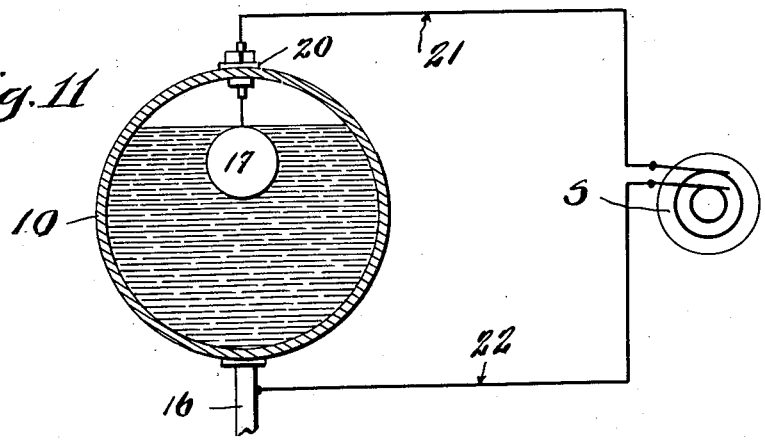
Figure 11 illustrates diagrammatically the action of the external alternating current when applied to such boiler.

It is not generally known that the formation and deposit of scale matter on the internal metal surfaces of boilers and their accessories is due to electrical action or current, self-generated or induced in the boiler by the operation thereof and which is due to the thermo-electro-motive force produced by the differences in temperature in the respective parts of the apparatus. This current is called "natural" for the reason that it is the nature of all steam boilers and their accessories to thermo-electrically generate a current of electricity. I therefore call this current "natural". This natural electric current in passing through the water contained in the boiler and which forms part of the circuit has a tendency to attract certain chemical molecules, such as calcium carbonate and calcium sulphate contained therein, and which causes such molecules to be attracted by and travel with the electrons of the natural electric circuit of the boiler. Upon reaching metal portions of the apparatus, such electrons continue in their travel therethrough, said metal portions being part of the electrical circuit, but the physical particles or molecules of the various chemicals upon coming into contact with such metal portions are stopped in their movement and caused to adhere thereto. As the flow of the thermo-electric or generated current is continuous and always in the same direction, it is obvious that in the course of operation of the boiler the constant deposit of the chemical molecules on said metal portions results in the formation of scale.

Many attempts have been made to overcome this condition by the use of an external electric current, as evidenced, for instance, by patents to Cumberland, Nos. 948,968 and 1,020,480, but these attempts have proved unsuccessful for the reason that they relied either on direct or on electric current produced by a thermo-couple which requires a critical and very accurate adjustment. These adjustments are necessary in such cases for the reason that the natural current generated by all steam boilers and their accessories is always commensurate with the intensity and the operating conditions of temperature under which the boiler apparatus operates in practice. Consequently, in operating any one of these systems there are times when the opposing or external current may be actually assisting the action of the natural or generated current while at other times it may not be of sufficient strength to be of any value.

The action of the natural or boiler current in depositing the scale forming matter on the metal portions of the boiler is identical to the electro-plating process. Therefore, the chemicals contained in the water which are susceptible to the influence of the electrons in passing therethrough are attracted thereby and deposited on the cathode element which, in this instance, is the inner surfaces of the boiler apparatus. In such cases where nothing is done to interfere with the action of the natural electric current of the boiler, the scale deposits are laid in perfect layers, the thickness of each layer depending upon the length of time this particular operating condition of the boiler has been allowed to go on uninterrupted.

Now it is well known that alternating electric current can not be used in electro-plating processes as it disorganizes and disintegrates the work laid down by the direct current. I therefore take advantage of this character of the alternating current for removing and preventing the scale and incrustation in boilers and their accessories by forcing an alternating or pulsating electric current through the path taken by the natural boiler current, thereby overcoming the latter and nullifying its action so that the scale depositing or plating process is stopped and the scale matter already deposited is torn down by the destructive action of such alternating current.

In my present method, I preferably employ alternating electric current to initially break down the scale structure that has already been formed. After all existing scale deposits have been satisfactorily removed, if desired, the appropriate points of the boiler apparatus can be electrically connected together so as to provide an external electric circuit for short-circuiting the natural current and preventing the travel thereof through the water contained in the boiler. However, if desired, this short-circuiting of the natural current need not be resorted to and the alternating current may be used continuously. The appropriate points for connecting the external circuit to the boiler apparatus are usually found to be at the top water line of the boiler at or near the egress of the main steam outlet which is also the hottest point of the apparatus, and at a point at or near the blow-off outlet of the boiler which is approximately the lowest point of temperature of the boiler apparatus.

Referring by numerals to the accompanying drawings, which illustrate a practical embodiment of my invention, 10 indicates an apparatus to which my invention is applied and which in the present instance is a stationary boiler of the Sterling type having four cross drums 11, 12, 13 and 14, respectively. These drums are connected by three banks of water tubes 15. Th lowermost portion of the drum 14 is provided with the usual blow-off pipe 16.

In practicing my method, I place at the top water line of one of the steam drums, immediately below the steam discharge connection thereof, a conductor or water contact element 17 which also acts as a point of distribution and connection, which, in the present instance, is located in the central drum 12.

In equipping large modern boiler units with my method of applying the alternating current, it may be necessary to place one or more of these elements at advantageous intervals, purely as a matter of better distribution and collection of the electric current throughout the water element. Likewise, it may become expedient to connect to the metallic parts of the boiler at more than one point the better to insure a more even distribution and collection of the electric currents handled by these parts of my system.

The conductor 17 is disposed longitudinally in the drum and is supported therein by cables 18 which are secured at one of their ends in any suitable manner to the drum and have their inner ends attached to insulators 19 carried by the ends of conductor 17. Thus said conductor is held in position in the water and is electrically insulated from the supporting cables 18. An insulator 20 is arranged in the top wall of drum 12 and extending therethrough and insulated from the drum is a wire connection 21, one end of which is connected to the conductor 17. A wire connection 22 is connected to the blow-off pipe 16 which is the coolest point of the boiler apparatus.

By connecting the connections 21 and 22 with the terminals of an alternating current circuit, the water in the boiler apparatus will be placed in series with the conductor 17 and the metal shell of the boiler and the action of the alternating current will counteract the generated boiler current and prevent further formation of scale. The continuous use of the alternating current for a suitable length of time will tear down the scale and incrustation deposited on the inner surfaces of the boiler apparatus and leave said metal portions free of all deposits.

Where the alternating current is supplied from the lighting circuit, the boiler and the water units can be placed in series with one of the lighting circuits and preferably in series with a lamp 25, which latter is used for illuminating the steam gauge 26, and is standard equipment with all boilers. As the loss of the current in passing through the water element of the boiler circuit is nil, an inexpensive means is provided for counteracting the natural current of the boiler. Furthermore, by placing lamp 25 in series with my circuit and the boiler, an effective visible means is provided for giving notice to the operator in case the water in the boiler gets too low, inasmuch as the falling of the water level below the conductor 17 will interrupt the continuity of the circuit and cut off the supply of current to said gauge. Besides, this arrangement affords the inexpensive and positive means of warning the attendants if any failure in the application of my method, or if continuity should be disturbed and when it occurs.

When it is desired to treat a locomotive boiler for removal of scale, the conductor 17 is disposed in the boiler 10$^a$ at or near the steam dome thereof and preferably adjacent to the steam connection 28. Said conductor is supported in position in any suitable manner such as clamping devices 29 which are adapted to be secured to flue tubes 30 or other suitable part of the boiler and receive the ends of cables 18. The insulator 20 is arranged in the steam dome or in the shell of the boiler as indicated at 31 and permits connection 21 to extend outwardly therefrom so that it can be connected to a suitable course of supply of alternating current while connection 22 is connected to the metal portion of the boiler at a point or points of lowest temperature. In order to obtain best results, I prefer to connect wire 22 to the ends of the boiler as indicated at 32 and 33. The locomotive boiler can be treated either while the locomotive is in the roundhouse, in which case the connections 21 and 22 are connected to a suitable source of alternating current such as a lighting circuit, or said boiler can be treated while the locomotive is in service, in which case said connections can be connected to the electric generator which forms part of the standard equipment of the locomotive. This generator, which is of the direct current type, can be easily altered to supply portion of the current in alternating form or a new generator can be provided to furnish both direct and alternating current.

In new locomotive boilers or in boilers from which the scale has been removed, connections 22 and 23 can be connected together to establish a short-circuit and divert the thermo-electric current externally of the boiler and away from the water element thereof.

Figure 12:
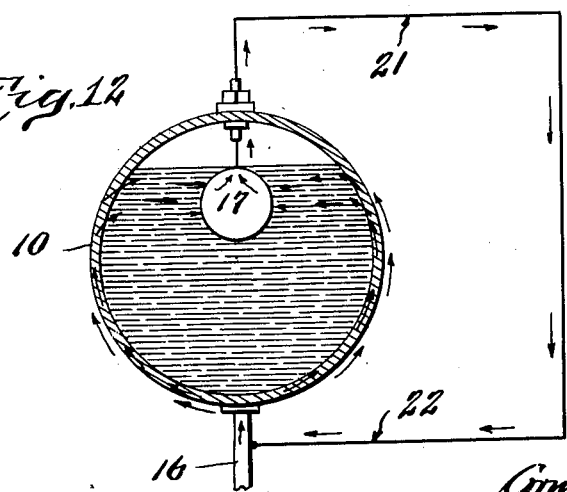
Figure 12 illustrates diagrammatically the path of the generated boiler or thermo-electric current when an external short circuit is applied to the appropriate points of the apparatus.

In Figure 9 I illustrate the method of applying my invention to a condenser 34 having a steam inlet 35, an outlet 36, and water inlet and outlet connections 37 and 38, respectively. One or more conductors 17 may be used and these are disposed in the upper portion of the water chamber in which the highest degree of temperature prevails while connection 22 is connected to the shell of the condenser as at 37 adjacent to the inlet connection of the cold water supply which is the coolest point in the apparatus. Normally, the natural electric current generated by the operating conditions of the boiler assumes the path as illustrated by arrows in Figure 10. When a conductor or electrode 17 is placed in the steam line of the water element, which is the point of highest temperature, and is then connected or short-circuited by wires 21 and 22 to the metal portion of the boiler having substantially lowest point of temperature, a short-circuit is established between the points of highest electrical potential of the natural electric current and the latter is thus diverted externally of the boiler as shown in Figure 12 so that said current can no longer pass through the water element and affect the scale forming chemicals contained therein.

My method and means for preventing the removing of scale is adapted to be also used in connection with steam and hot water boilers used for heating purposes and other apparatus having a metal liquid container and susceptible to scaling and incrustation produced by the thermal condition prevailing in such apparatus.

I claim:

1. Means for preventing formation of scale in steam boilers and their accessories comprising in combination with a boiler apparatus, of a contact element arranged in said apparatus at a point adjacent to the steam egress thereof and in contact with the water contained therein, and an external electric circuit having two terminals, one terminal connected to said contacting element and its opposite terminal to said boiler apparatus at a point remote from the first mentioned terminal, in respect to the points of greatest temperature differences.

2. Means for preventing scale and incrustation in steam boilers and their accessories comprising in combination with a boiler apparatus, a conductor arranged in the water of said apparatus substantially at the hottest point and insulated from said apparatus, and an external alternating current circuit connected at one terminal to said conductor and at its opposite terminal to the substantially coolest metal portion of said boiler.

3. Means for preventing scale and incrustation in steam and hot water boilers and their accessories comprising in combination with a boiler apparatus, of a conductor, and insulating means for supporting said conductor in the water of said boiler in spaced relation with the latter, and an external alternating current circuit connected at one end to said conductor and at its opposite end to a metal portion of said boiler remote from said conductor.

4. The combination with a boiler apparatus, of an electrode suspended in the water contained therein, and an alternating electric current including a source of supply connected at its terminals to said electrode and to the lower portion of said boiler apparatus, respectively.

5. The combination with a boiler apparatus, of a conductor arranged in the boiler water and insulated from said boiler, and a pulsating electric current including a source of supply connected in series with said conductor and said boiler, one terminal of said circuit being connected to said conductor and the other terminal to a comparatively cool portion of said boiler.

6. The combination with a boiler apparatus, of a conductor arranged in said boiler immediately below the top water line and insulated and spaced from said boiler and an external electric circuit having one terminal connected to said conductor and insulated from said boiler shell and having its opposite terminal connected to a comparatively cool portion of said boiler.

7. The combination with a boiler apparatus, of a conductor arranged in said boiler immediately below the top water line thereof and insulated and spaced from the metal of and insulated from the metal boiler shell, and an external electric circuit having its terminals connected respectively to said conductor and a metal portion of said boiler apparatus, said terminals being applied to the respective parts at points having extreme differences in temperatures.

8. The combination with a boiler apparatus, of a conductor arranged in and insulated from the metal shell of the boiler and located near the top water line thereof, and an external alternating circuit including a source of supply connected at its terminals to said conductor and a metal portion of said boiler, respectively, said terminals being applied to the respective parts at points of greatest thermal differences prevailing in said apparatus.

9. The combination with a boiler apparatus, of an electric circuit having its terminals applied, respectively, to the top or steam line of the water contained in the boiler and to the lowermost and coolest metal portion of said boiler for shortcircuiting the natural current generated by the operation of the boiler and for diverting said current away from the water contained therein.

10. The combination with a boiler apparatus, of an externally applied electric circuit connected at its terminals to the water at its hottest point and to the coolest metal portion of the boiler, respectively, for shortcircuiting and diverting externally the thermo-electric current produced by the operation of the boiler.

11. The combination with a boiler apparatus, of an alternating electric circuit including a source of supply, one of the terminals of said circuit being connected to the water of said circuit being connected to the water contained in the boiler and insulated from the latter and the other terminal being connected a cooler metal portion of said boiler, and an electric lamp interposed in said circuit and energized under normal operating conditions and rendered inactive when the water line of said boiler falls below the plane of contact thereof with the respective terminal of said circuit.

12. The combination with a steam boiler including a steam gauge thereof and an electric lamp for illuminating the latter, of an alternating lighting circuit for said lamp, one terminal of said circuit being connected to the water contained in said boiler and the other terminal to the coolest metal portion thereof whereby the current used for energizing said lamp is utilized to excite the water of the boiler and nullify the scale forming action of the boiler generated current.

13. The combination with a steam boiler including an electric lamp adapted to illuminate the boiler steam gauge, of an electrode arranged in the water contained in the boiler and insulated from the latter, an alternating lighting circuit connected in series with said lamp and having one terminal connected to said electrode and the opposite terminal to a metal portion of said boiler at a point remote from said electrode whereby the alternating current used for energizing said lamp is caused to travel through the water contained in the boiler thereby counteracting the scale forming action of the thermo-electric current generated by the operation of the boiler.

14. The combination with a steam boiler apparatus including an electric lamp used in combination therewith, of a conductor element disposed in the water contained in said apparatus at a predetermined elevation with respect to the top line of the water so that if the level of the water drops below a predetermined point the electrical connection between the water and said conductor is broken, and an electric lighting circuit for said lamp and having one terminal connected to said conductor and the opposite terminal to a metal portion of said boiler whereby the electric current utilized for energizing said lamp is also utilized for exciting the water contained in the boiler to counteract the action of the boiler generated current and said lamp serves to indicate the proper level of water in the boiler and the continuity of the treatment in removing and preventing scale and incrustation.

15. The combination with a metallic liquid container subjected to varying thermal conditions, of an electrode immersed in said liquid container at a point having extreme degree of temperature, and an external electric circuit, one terminal of which is connected to said electrode and insulated from said metallic container and the other terminal of which is connected to said container at a point of the opposite extreme of the temperature.

16. The combination of a metallic water container subjected to abnormal temperature, an electrode in said container and insulated therefrom, said electrode being immersed in the water substantially at or near the point of one extreme of the temperature prevailing in said apparatus, and an external electric circuit having one terminal connected to said electrode and the opposite terminal connected to said metallic container substantially at or near the point of the opposite extreme of the temperature of said apparatus.

17. The method of preventing incrustation and scale in steam and hot water boilers and their connections, consisting in diverting the electric current generated in the boiler externally thereof and away from the water contained therein.

18. The method of preventing incrustation and scale in steam and hot water boilers and their connections, consisting in establishing an external electrical circuit between the metal portion of a boiler and the water contained therein at points of substantially highest and lowest temperatures, respectively.

19. The method of removing and preventing incrustation and scale formation in steam boilers and their accessories consisting in electrically exciting the water and the metal of the boiler and its accessories with an alternating current of electricity and maintaining the excitation until the desired degree of removal of the incrustation and scale has been accomplished.

20. The method of removing and preventing incrustation and scale formation in steam boilers and their connections consisting in exciting the water and the metal portions of the boiler with an alternating or pulsating current of electricity until the desired degree of scale removal has been accomplished, and then in collecting at the highest points of electric potential the current generated by the boiler under operating conditions and diverting the said current outwardly and externally of the boiler by an electrical circuit of low resistance.

21. The method of removing and preventing scale and incrustation in boilers, which consists in simultaneously exciting the metallic portions of the boiler and the water contained therein, while under operating conditions, with an alternating current.

22. The method of removing and preventing scale and incrustation in boilers which consists in exciting the metallic portions of the boiler with an electric current applied thereto at points of thermal differences.

In testimony whereof I hereunto affix my signature this 6th day of March, 1925.

GEORGE S. NEELEY.